United States Patent
Sato

(10) Patent No.: US 7,801,387 B2
(45) Date of Patent: Sep. 21, 2010

(54) DIGITAL SIGNAL PROCESSING APPARATUS

(75) Inventor: Hiroki Sato, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1078 days.

(21) Appl. No.: 11/501,120

(22) Filed: Aug. 9, 2006

(65) Prior Publication Data

US 2007/0036459 A1 Feb. 15, 2007

(30) Foreign Application Priority Data

Aug. 12, 2005 (JP) ............................. 2005-234002

(51) Int. Cl.
*G06K 9/40* (2006.01)
(52) U.S. Cl. ..................... 382/260; 382/266; 382/275
(58) Field of Classification Search ................ 382/254, 382/260–264, 266–269, 274–275
See application file for complete search history.

(56) References Cited

U.S. PATENT DOCUMENTS

| 2001/0031097 A1* | 10/2001 | Mancuso et al. ............. 382/264 |
| 2002/0034337 A1* | 3/2002 | Shekter ...................... 382/275 |
| 2004/0024296 A1* | 2/2004 | Krotkov et al. ............. 600/322 |
| 2004/0105569 A1* | 6/2004 | Sharma et al. .............. 382/100 |
| 2004/0125113 A1* | 7/2004 | Kempf et al. ............... 345/611 |

FOREIGN PATENT DOCUMENTS

JP 2003-134352 9/2003

OTHER PUBLICATIONS

Chang et al., Chang et al. "Spatially Adaptive Wavelet Thresholding with Context Modeling for Image Denoising", IEEE Transactions on Image Processing, vol. 9 No. 9, Sep. 2000.*
Gupta et al., "A Wavelet Based Statistical Approach for Speckle Reduction in Medical Ultrasound Images", TENCON 2003. Conference on Convergent Technologies for Asia-Pacific Region, Oct. 2003, vol. 2, pp. 534-537.*
Belge et al., "Wavelet Domain Image Restoration with Adaptive Edge-Preserving Regularization", IEEE Transactions on IMage Processing, vol. 9 No. 4, Apr. 2000.*
Motwani et al., "Survey of Image Denoising Techniques", Proceedings of GSPx 2004, Sep. 27-30, 2004, Santa Clara Convention Center, Santa Clara, CA.*

* cited by examiner

*Primary Examiner*—Vu Le
*Assistant Examiner*—Nathan Bloom
(74) *Attorney, Agent, or Firm*—McGinn IP Law Group, PLLC

(57) ABSTRACT

A digital signal processing apparatus comprises a wavelet transforming device that divides an input digital signal into a first low-frequency sub band and a first high-frequency sub band by wavelet transformation and further divides the first low-frequency sub band into a second low-frequency sub band and a second high-frequency sub band, a coring device that executes a coring process to data of specific coordinates of the second high-frequency sub band, a judging device that judges whether the data of the specific coordinates of the second high-frequency sub band is an edge component or not with reference to peripheral data, in the second low-frequency sub band, of coordinates corresponding to the specific coordinates, and a coring controlling device that controls the coring device not to executes the coring process to the data of the specific coordinates when the judging device judges that the data is an edge component.

1 Claim, 7 Drawing Sheets

DIGITAL SIGNAL PROCESSING APPARATUS

CROSS REFERENCE TO RELATED APPLICATION

This application is based on Japanese Patent Application 2005-234002, filed on Aug. 12, 2005, the entire contents of which are incorporated herein by reference.

BACKGROUND OF THE INVENTION

A) Field of the Invention

This invention relates to a digital signal processing apparatus, and more in detail, a digital signal processing apparatus that executes a noise reduction of a digital image signal by using a wavelet transformation.

B) Description of the Related Art

FIG. 4 to FIG. 6 are schematic views for explaining a two-dimensional wavelet transformation of a digital image signal. FIG. 4 is a block diagram showing an outline of a wavelet transformation unit. FIG. 5 is a block diagram showing an outline of an inverse wavelet transformation unit. FIG. 6 is a plan view schematically showing an image signal to which the wavelet transformation is executed.

When a digital image signal X0 is input to the wavelet transformation unit 11, it is transferred to a low path filter LPF and a high path filter HPF. Each of a high-frequency-filtered (a low frequency component) signal filtered by the low path filter LPF and a low-frequency-filtered (a high frequency component) signal filtered by the high path filter HPF is transferred to a down-sampling unit 4 and a half of signals in a horizontal direction is culled to be frequency-decomposed to the sub-band data of the low frequency component in the horizontal direction L and the high frequency component in the horizontal direction H.

The low frequency component in the horizontal direction L is transferred to the low path filter LPF and the high path filter HPF. After that, each of them is transferred to the down-sampling unit 4 and is culled to a half in the vertical direction to be decomposed into sub-band data of a component LL1 consisting of low frequency components in the horizontal and vertical directions and a component LH1 consisting of a low frequency component in the horizontal direction and a high frequency component in the vertical direction. Also, the high frequency component in the horizontal direction H is transferred to the low path filter LPF and the high path filter HPF. After that, each of them is transferred to the down-sampling unit 4 and is culled to a half in the vertical direction to be decomposed into sub-band data of a component HH1 consisting of high frequency components in the horizontal and vertical directions and a component HL1 consisting of a high frequency component in the horizontal direction and a low frequency component in the vertical direction. Each of the decomposed sub-band data (LL1, LH1, HH1, HL1) is rearranged by an interleave transformation unit 5 to be arranged as a screen 100b shown in the upper right section in FIG. 6.

In the wavelet transformation unit 1, a reflexive transform can be executed to a desired sub-band data. For example, sub-band data (LL2, LH2, HH2 and HL2) shown in the lower right section in FIG. 6 can be obtained by re-inputting the horizontal and vertical low frequency component LL1 as an input signal X0 to the wavelet transformation unit 1. As described in the above, sun-band data in a specific frequency band can be obtained by repeating the reflexive transform by predetermined times to a predetermined sub-band data.

The wavelet inverse transform unit 2 recovers the decomposed sub-band data by executing the inverse transform, and the interleave inverse transform unit 5 reconstructs the recovered data to the original image.

FIG. 7 is a block diagram for explaining a noise reduction process according to a conventional digital signal processing apparatus 200 used the wavelet transformation.

The digital signal processing apparatus 200 decomposes a digital image signal X0 to the sub-band data LL1, LH1, HH1 and HL1 by the wavelet transformation already explained with reference to FIG. 4 to FIG. 6. Moreover, the sub-band data LL of low frequency components in the horizontal and vertical directions is further processed by the wavelet transformation, and transformation of the obtained sub-band data LL of low frequency components in the horizontal and vertical directions is repeated for predetermined (n) times (for example, two to eight times) to obtain sub-band data LLn, LHn, HHn and HLn. A coring process described later is executed to the obtained sub-band data LHn, HHn and HLn, and the original image signal is recovered by repeating the inverse wavelet transformations. By executing these processes, for example, low band noise can be restrained as in Japanese Laid-Open Patent 2003-134352. Besides, in this specification, further executing the wavelet transformation to the sub-band data obtained by the wavelet transformation is called "a reflexive wavelet transformation".

FIG. 8A and FIG. 8B and FIG. 9A to FIG. 9E are graphs for explaining the coring process.

FIG. 8A is a graph showing a relationship between an input signal and an output signal without the coring process. The coring process is, for example, a process for controlling the signal when an absolute value of the input signal is lower than the threshold value (for example, making the signal impartially "0" when the signal equals to a threshold value or less than the threshold value). When the coring process is executed to the signal with the relationship shown in FIG. 8A, the input signal lower than the threshold value is out put as "0" to get a relationship of the input signal and the output signal shown in FIG. 8B.

More in detail, the wavelet transformation is executed to the input signal X0 shown in FIG. 9B to decompose it to the low frequency component L1 shown in FIG. 9B and the high frequency component H1 shown in FIG. 9C, and the coring process is executed to the high frequency component H1. By doing that, the high frequency component H1 of which a part lower than the threshold value (a part surrounded by a dotted line) is set to "0" can be obtained. Then, a recovered signal X0' of which the noise is reduced as shown in FIG. 9E can be obtained by executing the inverse wavelet transformation to the low frequency component L1 and a high frequency component H1'.

As the above-described conventional digital signal processing apparatus, when the reflexive wavelet transformation is repeated and the coring process to the sub-band of the specific band is executed in order to reduce the specific band noise, ringing is generated on the image based on the recovered signal, and an amplitude phase may be changed. Also, to reduce the noise in the specific band, a gap of the phase will be accumulated.

SUMMARY OF THE INVENTION

It is an object of the present invention to provide a digital signal processing apparatus that can control generation of ringing and a digital signal noise.

According to one aspect of the present invention, there is provided a digital signal processing apparatus, comprising: a wavelet transforming device that divides an input digital signal into a first low-frequency sub band and a first high-frequency sub band by wavelet transformation and further divides the first low-frequency sub band into a second low-frequency sub band and a second high-frequency sub band; a coring device that executes a coring process to data of specific coordinates of the second high-frequency sub band; a judging device that judges whether the data of the specific coordinates of the second high-frequency sub band is an edge component or not with reference to peripheral data, in the second low-frequency sub band, of coordinates corresponding to the specific coordinates; and a coring controlling device that controls the coring device not to executes the coring process to the data of the specific coordinates when the judging device judges that the data of the specific coordinates of the second high-frequency sub band is an edge component.

According to another aspect of the present invention, there is provided a digital signal processing apparatus, comprising: a wavelet transforming device that divides an input digital signal into a first low-frequency sub band and a first high-frequency sub band by wavelet transformation and further divides the first low-frequency sub band into a second low-frequency sub band and a second high-frequency sub band; a coring device that executes a coring process to data of specific coordinates of the second high-frequency sub band; a low-pass filtering device that executes a low-pass filtering process to the second low-frequency sub band for extracting a third low-frequency sub band; a judging device that judges whether the data of the specific coordinates of the second high-frequency sub band is an edge component or not with reference to peripheral data, in the third low-frequency sub band, of coordinates corresponding to the specific coordinates; and a coring controlling device that controls the coring device not to executes the coring process to the data of the specific coordinates when the judging device judges that the data of the specific coordinates of the second high-frequency sub band is an edge component.

According to the present invention, generation of ringing is restrained, and a digital signal processing apparatus that can reduce the digital signal noise can be provided.

BRIEF DESCRIPTION OF THE DRAWINGS

FIG. 2A is an enlarged plan view representing the same coordinates of each sub-band, and FIG. 2B is an enlarged peripheral plan view of the same coordinates.

FIG. 8A and FIG. 88 are graphs for explaining the coring process.

DETAILED DESCRIPTION OF THE PREFERRED EMBODIMENTS

Figure 1:
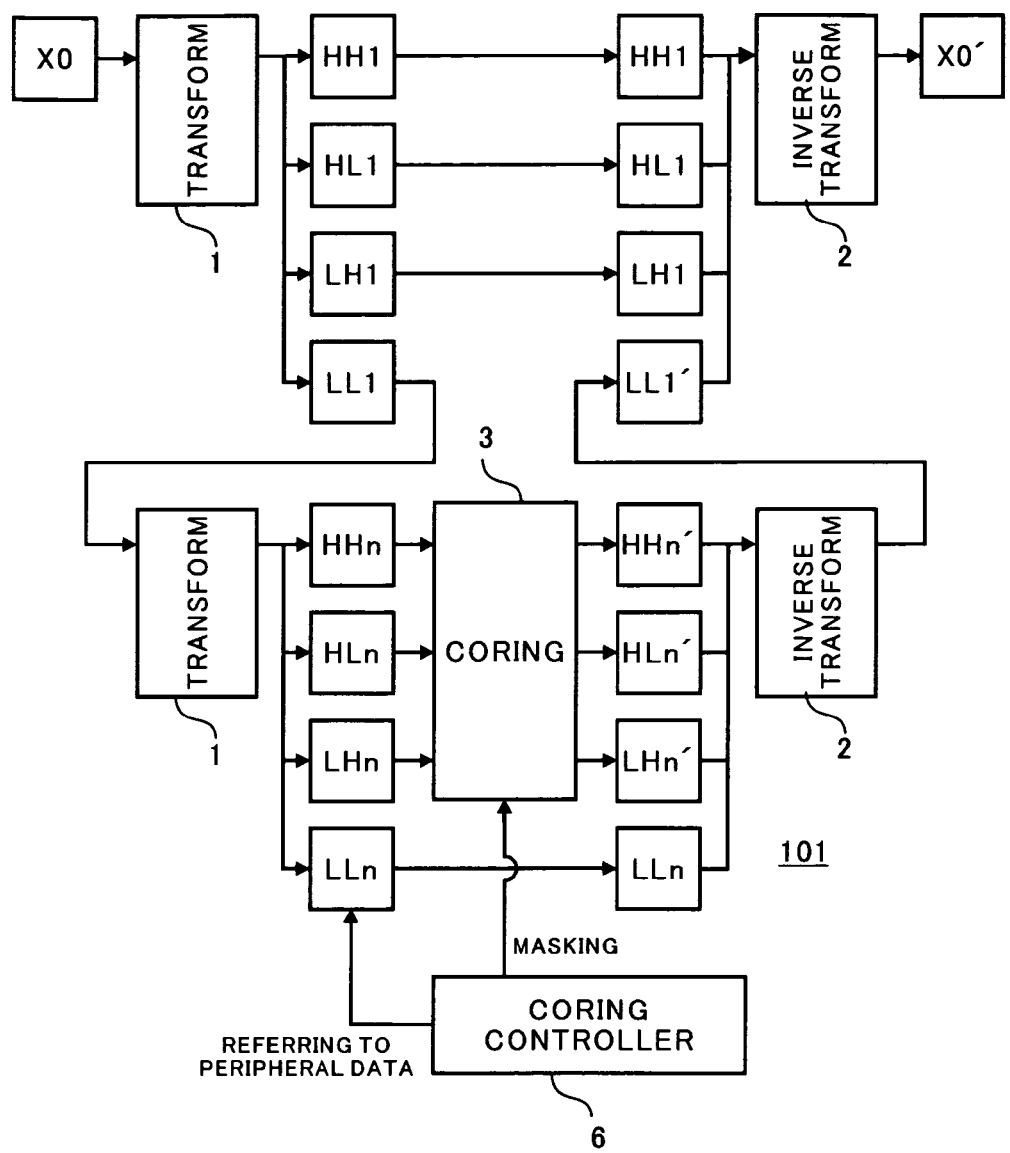
FIG. 1 is a block diagram showing a structure of a digital signal processing apparatus 101 according to a first embodiment of the present invention.

FIG. 1 is a block diagram showing a structure of a digital signal processing apparatus 101 according to a first embodiment of the present invention.

A digital signal processing apparatus 101 includes at least a wavelet transformation device 1, an inverse wavelet transformation device 2, and a coring processing unit 3. The digital signal processing apparatus 101 decomposes an input digital image signal X0 to sub-band data of predetermined bands by a reflexive wavelet transformation. Then, a corning process is executed to a horizontal low and vertical high frequency component (horizontal low and vertical high frequencies component) LHn, a high frequency component in the horizontal direction (horizontal and vertical high frequencies component) HHn and a horizontal high and vertical low frequency component (horizontal high and vertical low frequencies component) HLn (hereinafter, these three sub-ban data are generically called a high frequency sub-band data) with reference to a low frequency component LLn in the horizontal and vertical directions (hereafter called a low frequency sub-band data) to eliminate or reduce a noise component.

Figure 4:
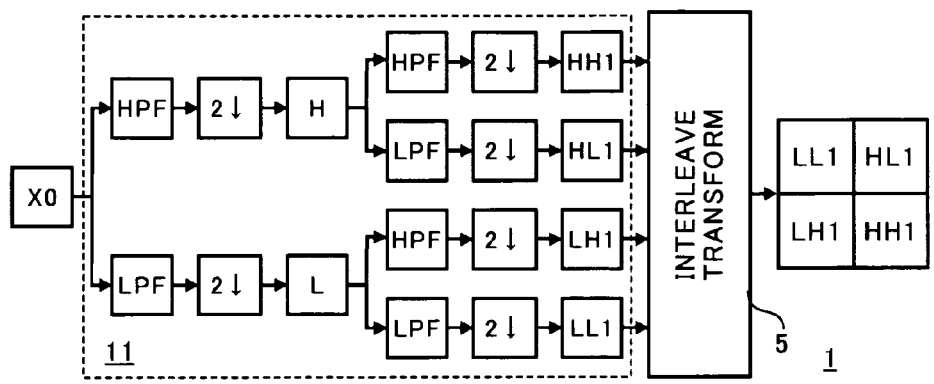
FIG. 4 is a block diagrams showing outlines of a wavelet transformation unit.

The wavelet transformation device 1 has the same structure as the conventional wavelet transformation device 1 shown in FIG. 4. After the frequency decomposition of the digital image signal X0 to be input to the sub-band data of the low frequency component L in a horizontal direction and the high frequency component H in a horizontal direction, the horizontal low frequency component L is decomposed to the sub-band data of a horizontal and vertical low frequency component LL1 and a horizontal low and vertical high frequency component LH1. The horizontal high frequency component H is decomposed to a horizontal and vertical high frequency component HH1 and a horizontal high and vertical low frequency component HL1.

Moreover, the wavelet transformation device 1 can obtain sub-band data of a specific frequency band by reflexively executing the wavelet transformation to the horizontal and vertical low frequency component LL obtained by the decomposition. In this specification, "n" as in the horizontal and vertical low frequency component LLn, the horizontal low and vertical high frequency component LHn, the horizontal and vertical high frequency component HHn and the horizontal high and vertical low frequency component HLn indicates the number of times that the wavelet transformation is repeated. For example, the sub-band data LLn, LHn, HHn and HLn are the sub-band data obtained by executing the reflexive wavelet transformation to the sub-band data LLn−1. That is, the sub-band data LL2, LH2, HH2 and HL2 are the sub-band data obtained by executing the reflexive wavelet transformation to the sub-band data LL1.

Next, a coring process is executed to each high frequency sub-band data in the four regions on the screen by a coring processing unit 3. This coring process is the same process as the conventional coring process explained with reference to FIG. 8A and FIG. 8B and FIG. 9A to FIG. 9E. That is, the coring process is a process for controlling the signal when an absolute value of the input signal is lower than the threshold value (for example, making the signal impartially "0" when the signal equals to a threshold value or less than the threshold value). As different from the conventional coring process, the coring processing unit 3 according to the embodiment of the present invention executes the coring process to the data of each coordinates of the high frequency sub-band data (LHn, HLn and HHn) after receiving a coring control (masking instruction) from a coring control unit 6. For example, the coring unit 3 does not execute the coring process to the data of the coordinates to which the masking instruction is received and does execute the process to the data other than that.

The coring control (masking instruction) unit 6 controls the coring to an edge component by using that image coordinates position can be applied to the data transformed by the wavelet transformation without a change. When the coring to the edge component is executed, possibility to generate ringing by changing the phase will be increased. Then, in the embodiment of the present invention, this coring control unit 6 detects the edge component by referring the low frequency sub-band data LLn, and controls the coring processing unit 3 in order not to execute the coring process to the detected edge component of the high frequency sub-band data LHn, HLn and HHn. A detecting method of the edge component is explained later with reference to FIG. 2.

Figure 5:
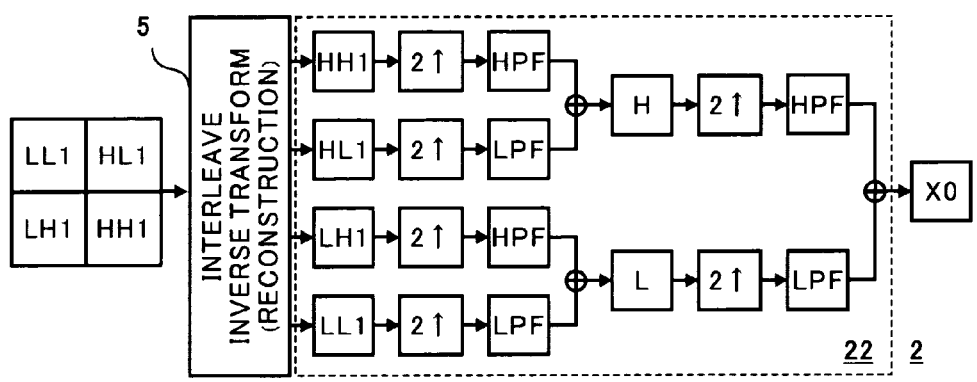
FIG. 5 is a block diagrams showing outlines of an inverse transformation unit.
Figure 6:
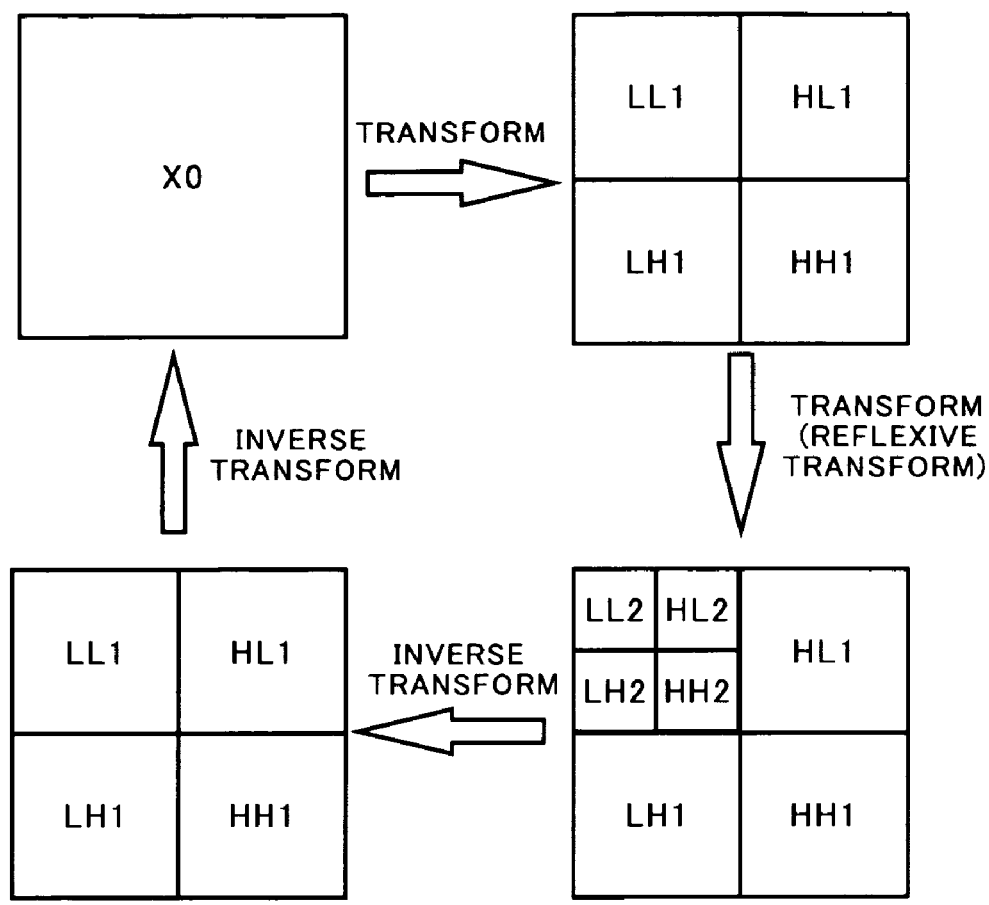
FIG. 6 is a plan view schematically showing the image signal executed the wavelet transformation.
Figure 7:
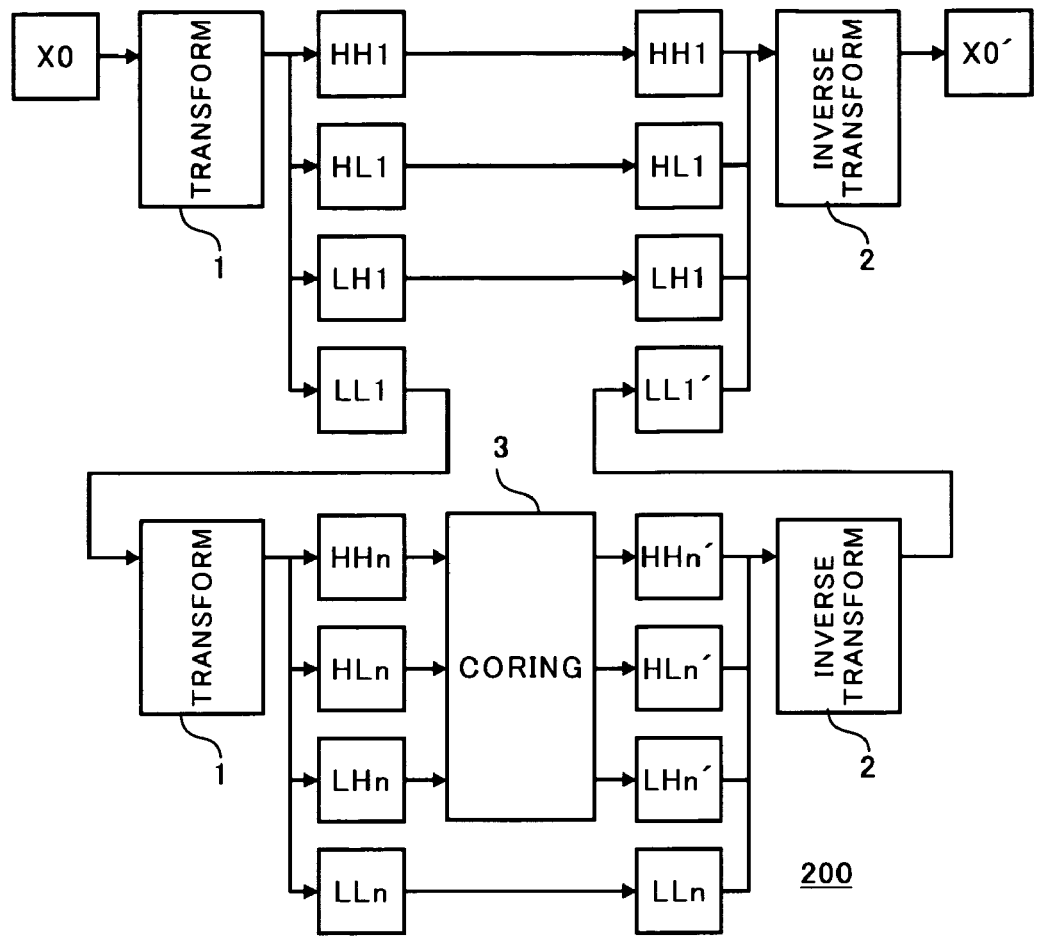
FIG. 7 is a block diagram for explaining a noise reduction process according to a conventional digital signal processing apparatus 200 used the wavelet transformation.
Figure 8A:
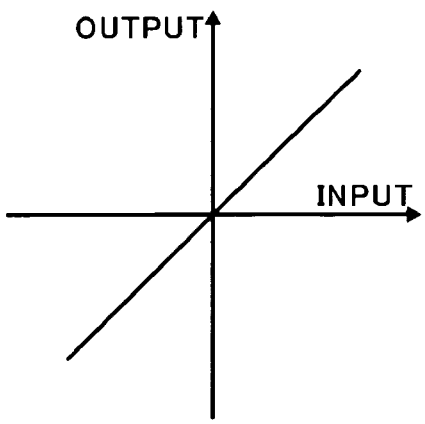
Figure 8B:
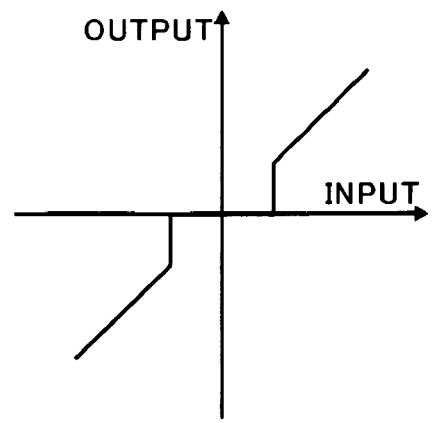
Figure 9A:
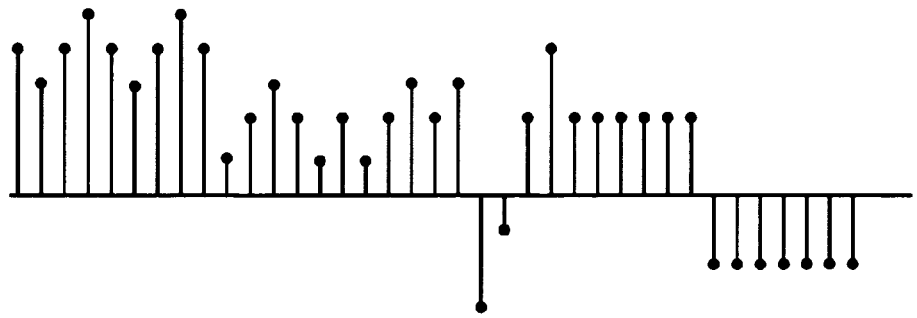
FIG. 9A to FIG. 9E are graphs for explaining the coring process.
Figure 9B:
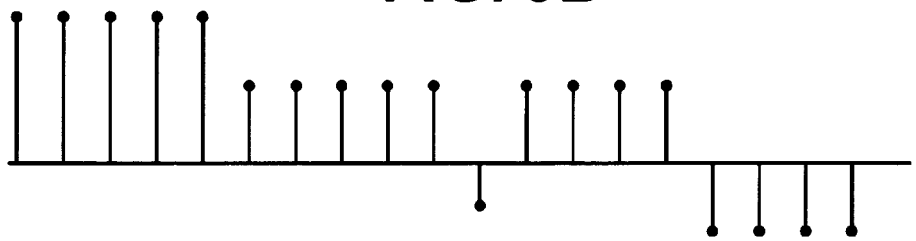
Figure 9C:
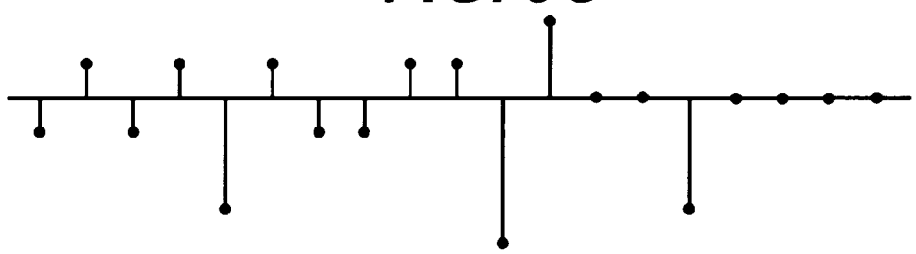
Figure 9D:
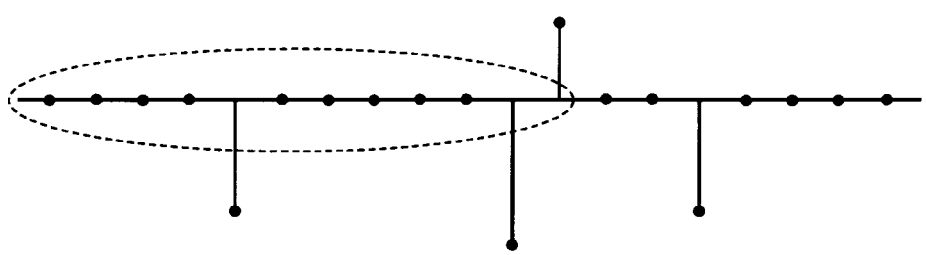
Figure 9E:
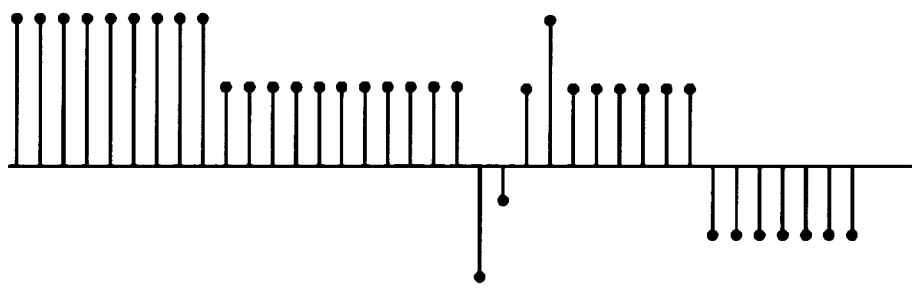

The inverse wavelet transformation device 2 recovers the sub-band data to which the coring process is executed by the inverse wavelet transformation, rebuilds the recovered data by an interleave transformation unit 5 and outputs noise reduced output signal X0'. The structure of the inverse wavelet transformation device 2 is same as the conventional inverse wavelet transformation device 2 shown in FIG. 5.

Figure 2A:
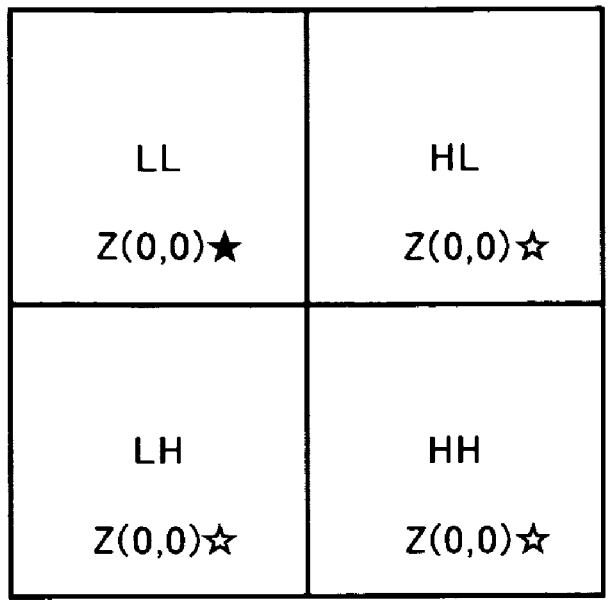
FIG. 2A and FIG. 2B are schematic diagrams for explaining a coring mask process according to the first embodiment of the present invention.
Figure 2B:
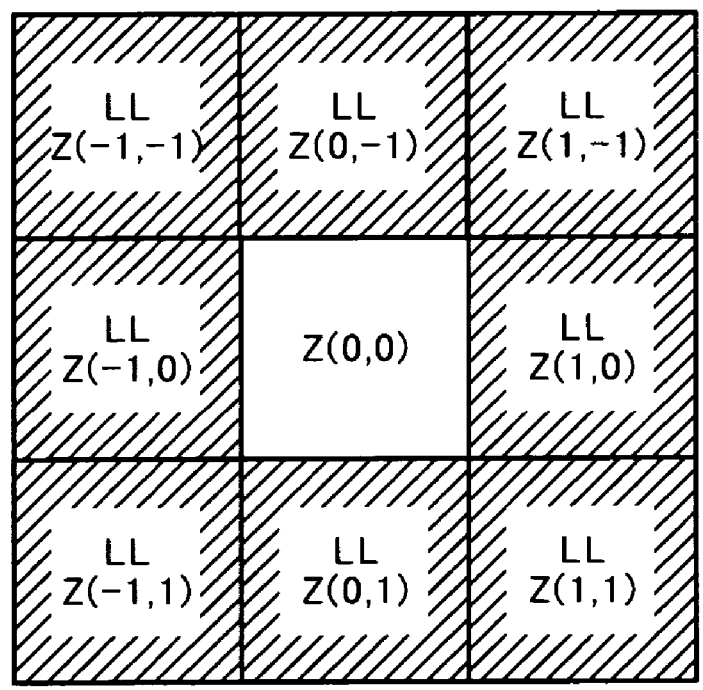

FIG. 2A and FIG. 2B are schematic diagrams for explaining a coring mask process according to the first embodiment of the present invention. FIG. 2A is an enlarged plan view representing the same coordinates of each sub-band, and FIG. 2B is an enlarged peripheral plan view of the same coordinates.

Both black star and white star shown in FIG. 2A indicate the same coordinate points Z(0,0) on the original digital image signal X0. In the embodiment of the present invention, it is judged whether the data at the coordinates Z (0,0) of the high frequency sub-band HHn is an edge component or not with reference to the peripheral data adjacent to the same coordinates Z(0,0) of the low frequency sub-band LLn indicated with the black star in order to judge whether the coring should be executed or not to the data at the coordinates Z(0,0) of the high frequency sub-band HHn indicated with white star.

Referring to the peripheral data is executed by the following way. For example, at first, data of coordinates Z(−1, −1), Z(0, −1), Z(1, −1), Z(−1.0), Z(1, 0), Z(−1. 1), Z(0, 1) and Z(1, 1) each of which is adjoining to the same coordinates Z(0, 0) in the low-frequency sub band LLn are summed and averaged. Thereafter, difference values between the averaged sum of the data and data of the same coordinates Z(0, 0) in the high-frequency sub bands (LH, HL, and HH), which are target values of judging necessity of the coring process, are calculated, and an absolute value of each difference value is calculated (refer to the equations (1) and (2)).

$$Z_1 = Z(-1,-1) + Z(0,-1) + Z(1,-1) + Z(-1,0) + Z(1,0) + Z(-1,1) + Z(0,1) + Z(1,1) \quad (1)$$

$$Z_2 = ABS(Z(0,0) - Z') \quad (2)$$

Next, this different value (absolute value $Z_2$) is compared to the adoptable range parameter (P), and it is judged whether the same coordinates data Z(0,0) in the high frequency sub-band data (LHn, HLn, HHn) are the edge component or not. At this time, the different value (absolute value $Z_2$) is same as the adoptable parameter (P) or less ($Z_2 \leq P$), the coring control unit 3 is controlled so that the coring process is executed to the same coordinate data Z(0,0) in the high frequency sub-band (LHn, HLn, HHn). On the other hand, when the different value (absolute value $Z_2$) is more ($Z_2 < P$) than the adoptable range parameter (P), the coring control unit 3 controls not to execute the coring process to the same coordinate data Z(0,0) in the high frequency sub-band data (LHn, HLn, HHn). Moreover, the adoptable range parameter (P) is a fixed value for judging whether the data at the coordinate is the edge component or not.

As described in the above, according to the first embodiment of the present invention, it is judged whether the data at the specific coordinates of the high frequency sub-band data (LHn, HLn, HHn) are the edge component or not by referring the peripheral coordinate data of the specific coordinates of the low frequency sub-band data LLn to the specific coordinates data of the high frequency sub-band data (LHn, HLn, HHn). Then, according to the judgment, the coring process is not executed to the edge component. Therefore, since the coring process on the edge component that tends to generate ringing can be omitted, ringing can be restrained and noise can be eliminated or reduced.

Figure 3:
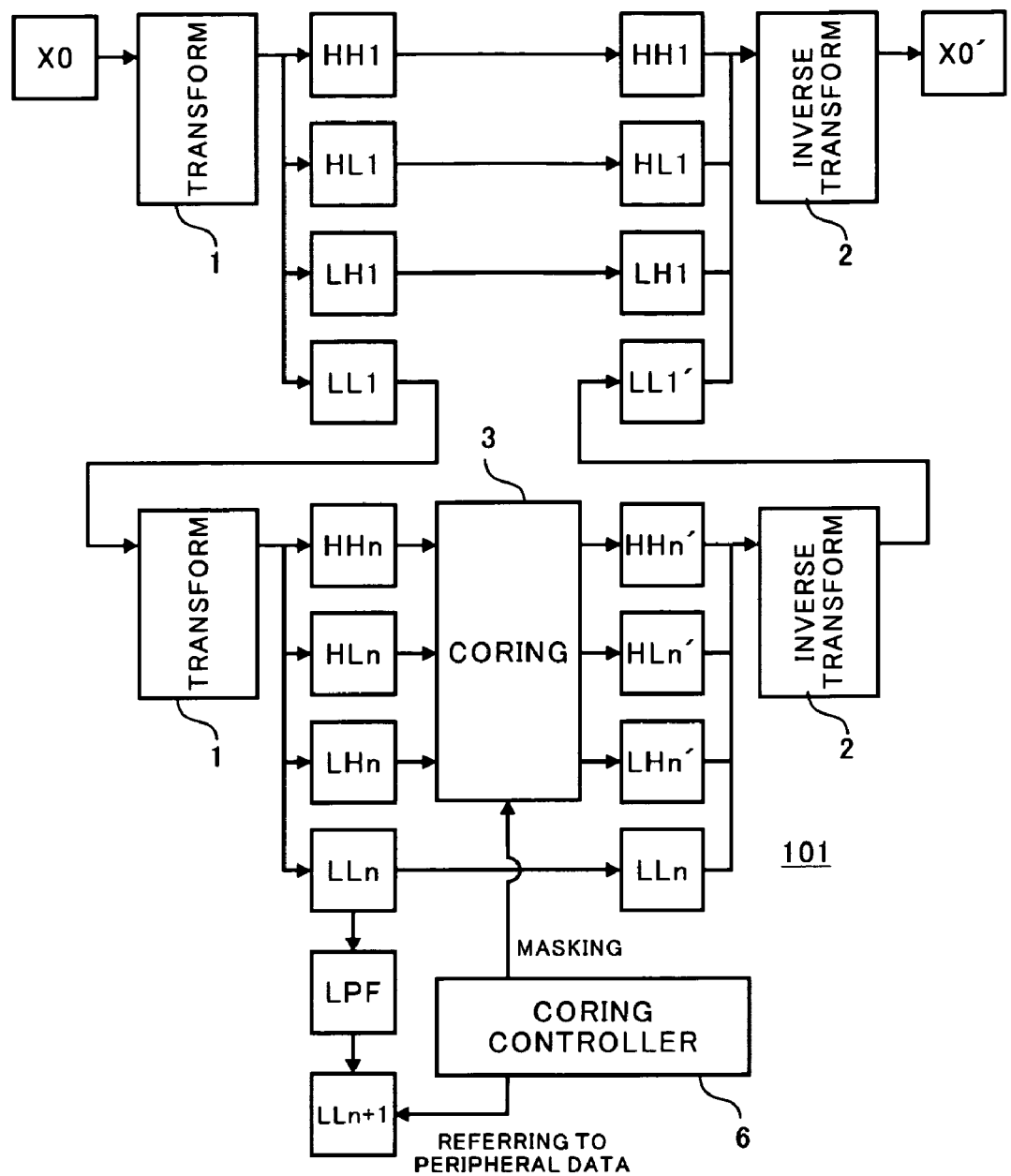
FIG. 3 is a block diagram showing a structure of a digital signal processing apparatus 102 according to a second embodiment of the present invention.

FIG. 3 is a block diagram showing a structure of a digital signal processing apparatus 102 according to a second embodiment of the present invention.

Differences between this second embodiment and the first embodiment are that the low path filter process is executed on the low frequency sub-band LLn and detection (coring control) of the edge component is executed with reference to the low frequency sub-band LLn+1 to which the low path filter process is executed. The structure and the processes other than the above are the same as those according to the first embodiment.

As described in the above, generation of ringing can be restrained and noise in the low band can be reduced by referring to the peripheral coordinates data of the specific coordinates of the low frequency sub-band LLn+1 by the coring control unit 6 after executing the low path filter process to the low frequency sub-band data LLn.

The present invention has been described in connection with the preferred embodiments. The invention is not limited only to the above embodiments. It is apparent that various modifications, improvements, combinations, and the like can be made by those skilled in the art.

What are claimed are:

1. A digital signal processing apparatus, comprising:
   a wavelet transforming device that divides an input digital signal into a first low-frequency sub band and a first high-frequency sub band by wavelet transformation and further divides the first low-frequency sub band into a second low-frequency sub band and a second high-frequency sub band;
   a coring device that executes a coring process to data of specific coordinates of the second high-frequency sub band;
   a low-pass filtering device that executes a low-pass filtering process to the second low-frequency sub band for extracting a third low-frequency sub band;
   a judging device that judges whether the data of the specific coordinates of the second high-frequency sub band is an edge component or not with reference to peripheral data, in the third low-frequency sub band, of coordinates corresponding to the specific coordinates; and
   a coring controlling device that controls the coring device not to execute the coring process to the data of the specific coordinates when the judging device judges that the data of the specific coordinates of the second high-frequency sub band is the edge component.

* * * * *